US012589349B2

(12) United States Patent
Karimi Vardanjani

(10) Patent No.: US 12,589,349 B2
(45) Date of Patent: Mar. 31, 2026

(54) HIGH CAPACITY CARBON DIOXIDE ABSORBENT SOLVENT RESISTANT TO OXIDATIVE DEGRADATION

(71) Applicant: Safieh Karimi Vardanjani, Shahrekord (IR)

(72) Inventor: Safieh Karimi Vardanjani, Shahrekord (IR)

( * ) Notice: Subject to any disclaimer, the term of this patent is extended or adjusted under 35 U.S.C. 154(b) by 622 days.

(21) Appl. No.: 18/098,021

(22) Filed: Jan. 17, 2023

(65) Prior Publication Data

US 2023/0149851 A1 May 18, 2023

(51) Int. Cl.
 *B01D 53/14* (2006.01)
 *B01D 53/62* (2006.01)
 *B01D 53/78* (2006.01)

(52) U.S. Cl.
 CPC ..... *B01D 53/1493* (2013.01); *B01D 53/1475* (2013.01); *B01D 53/62* (2013.01); *B01D 53/78* (2013.01); *B01D 2251/306* (2013.01); *B01D 2251/604* (2013.01); *B01D 2252/20484* (2013.01); *B01D 2252/604* (2013.01); *B01D 2257/504* (2013.01); *B01D 2258/0233* (2013.01); *B01D 2258/025* (2013.01); *B01D 2258/0283* (2013.01)

(58) Field of Classification Search
 CPC ............ B01D 53/1493; B01D 53/1475; B01D 53/62; B01D 53/78; B01D 2251/306; B01D 2251/604; B01D 2252/20484;
 B01D 2252/604; B01D 2257/504; B01D 2258/0233; B01D 2258/025; B01D 2258/0283; B01D 2252/20478; Y02C 20/40

See application file for complete search history.

(56) References Cited

U.S. PATENT DOCUMENTS

| 2002/0147109 A1* | 10/2002 | Branover | B01J 20/22 |
| | | | 423/229 |
| 2012/0122195 A1* | 5/2012 | Fradette | B01D 53/96 |
| | | | 435/266 |
| 2013/0287662 A1* | 10/2013 | Chuang | B01D 53/62 |
| | | | 423/242.7 |
| 2015/0273432 A1* | 10/2015 | Eisenberger | B01J 20/262 |
| | | | 252/190 |
| 2023/0294069 A1* | 9/2023 | Jones | B01J 20/183 |
| | | | 502/62 |
| 2024/0165584 A1* | 5/2024 | Gitterman | B01J 20/10 |

FOREIGN PATENT DOCUMENTS

| WO | WO-2008021700 A1 * | 2/2008 | B01J 20/10 |
| WO | WO-2012034040 A1 * | 3/2012 | B01D 53/62 |

* cited by examiner

*Primary Examiner* — Mark Kopec
*Assistant Examiner* — Jaison P Thomas

(57) ABSTRACT

An oxidation resistant absorbent for capturing carbon dioxide from a gas stream. The oxidation resistant absorbent includes an alkanolamine with a weight percent in a range of 10 wt. % to 35 wt. % to a total amount of the oxidation resistant absorbent, a base with a weight percent in a range of 1 wt. % to 15 wt. % to a total amount of the oxidation resistant absorbent, a plurality of nanoparticles with a weight percent in a range of 0.1 wt. % to 3 wt. % to a total amount of the oxidation resistant absorbent, and water.

9 Claims, 2 Drawing Sheets

<u>100</u>

HIGH CAPACITY CARBON DIOXIDE ABSORBENT SOLVENT RESISTANT TO OXIDATIVE DEGRADATION

TECHNICAL FIELD

The present disclosure generally relates to a solvent for capturing Carbon dioxide ($CO_2$) from gas streams, and particularly, a solvent for $CO_2$ absorption with high resistance against oxidative degradation and high absorption capacity.

BACKGROUND

Carbon dioxide ($CO_2$) is a major greenhouse gas that must be captured from gas streams prior to atmospheric discharge in order to meet environmental requirements, that is, requirements to minimize negative impact to the environment. Aqueous solutions of alkanolamines are widely used for $CO_2$ removal from natural, refinery, and manufactured gases, such as flue gas streams. However, alkanolamine solvents (especially monoethanolamine (MEA)) are degraded mainly by oxidative degradation at absorber condition and thermal degradation at stripper condition of an amine based $CO_2$ removal plant. Amine degradation not only leads to amine losses, but may also contribute to operational problems such as foaming, corrosion, high solution viscosity, and fouling leading to decreasing plant life. A plethora of research has been carried out to improve a process of $CO_2$ removal and/or improving alkanolamine solvents to prevent their corruption, such as adding corrosion inhibitors to reduce equipment corrosion in the presence of salts resulting from amine degradation, removing oxygen from flue gas inlet using Duct Burner method or reducing it using Carbutol method, reducing an amount of dissolved oxygen in amine by passing the amine through an oxygen stripping tower, reducing oxygen in amine solvent by depressurization using a flash drum, utilizing a mixture of first, second, and third type amines (blended amine), etc. However, the approaches for development and improvement in processes and compositions for $CO_2$ removal discussed above are mostly complicated, high energy consuming, and expensive.

There is, therefore, a need for high-efficient, cost-effective, easily accessible, and low-energy consuming solvent compositions and processes for $CO_2$ removal from gas streams while overcoming solvent degradation. Moreover, there is a need for solvents capable of reducing solubility of oxygen in addition to having a reduced combination affinity. Furthermore, there is a need for a solvent being adaptable to conditions of a target carbon capturing site.

SUMMARY

This summary is intended to provide an overview of the subject matter of the present disclosure, and is not intended to identify essential elements or key elements of the subject matter, nor is it intended to be used to determine the scope of the claimed embodiments. The proper scope of the present disclosure may be ascertained from the claims set forth below in view of the detailed description below and the drawings.

In one general aspect, the present disclosure describes an exemplary oxidation resistant absorbent for capturing carbon dioxide from a gas stream. The oxidation resistant absorbent may include an alkanolamine with a weight percent in a range of 10 wt. % to 35 wt. % to a total amount of the oxidation resistant absorbent, a base with a weight percent in a range of 1 wt. % to 15 wt. % to a total amount of the oxidation resistant absorbent, and a plurality of nanoparticles with a weight percent in a range of 0.1 wt. % to 3 wt. % to a total amount of the oxidation resistant absorbent.

In an exemplary embodiment, the alkanolamine may include at least one of Monoethanolamine (MEA), Diethanolamine (DEA), Triethanolamine (TEA), Methyldiethanolamine (MDEA), Diisopropanolamine (DIPA), Diglycolamine (DGA), and combinations thereof. In an exemplary embodiment, the alkanolamine may include MEA with a weight percent of 30 wt. % to a total amount of the oxidation resistant absorbent.

In an exemplary embodiment, the base may include at least one of a salt of an alkali metal, a salt of an alkaline earth metal, and combinations thereof. In an exemplary embodiment, the base may include at least one of Potassium hydroxide (KOH), Potassium carbonate ($K_2CO_3$), Sodium hydroxide (NaOH), Sodium carbonate ($Na_2CO_3$), and combinations thereof. In an exemplary embodiment, the base may include KOH with a weight percent of 5 wt. % to a total amount of the oxidation resistant absorbent.

In an exemplary embodiment, the plurality of nanoparticles may include a plurality of alumina-coated silica nanoparticles. In an exemplary embodiment, each alumina-coated silica nanoparticle of the plurality of alumina-coated silica nanoparticles may include a silica nanoparticle coated with a layer of alumina.

In an exemplary embodiment, the oxidation resistant absorbent may further include water. In an exemplary embodiment, a remaining weight percent of the oxidation resistant absorbent except the alkanolamine, the base, and the plurality of nanoparticles may include water.

In another general aspect, the present disclosure describes an exemplary method for fabricating an oxidation resistant absorbent for capturing carbon dioxide from a gas stream. The method may include forming a first solution by dissolving an alkanolamine in water at a temperature in a range of 25° C. to 30° C. and a pressure of 1 bar, forming a second solution by adding a base to the first solution at a temperature in a range of 25° C. to 30° C. and a pressure of 1 bar, and adding a plurality of nanostructured material to the second solution. In an exemplary embodiment, adding the base to the first solution may include dissolving the base in the first solution.

In an exemplary embodiment, adding the plurality of nanostructured material to the second solution may include forming a mixture of the plurality of nanostructured material and the second solution by mixing the plurality of nanostructured material with the second solution in a vessel at a temperature in a range of 25° C. to 30° C. and a pressure of 1 bar and dispersing the plurality of nanostructured material in the second solution. In an exemplary embodiment, dispersing the plurality of nanostructured material in the second solution may include increasing a pressure of the mixture of the plurality of nanostructured material and the second solution up to 200 bar utilizing a supersonic jet pump and recycling the pressurized mixture of the plurality of nanostructured material and the second solution into the vessel.

In an exemplary embodiment, the alkanolamine may include at least one of Monoethanolamine (MEA), Diethanolamine (DEA), Triethanolamine (TEA), Methyldiethanolamine (MDEA), Diisopropanolamine (DIPA), Diglycolamine (DGA), and combinations thereof. In an exemplary embodiment, the alkanolamine may be present in the formed oxidation resistant absorbent with a weight percent in a range of 10 wt. % to 35 wt. % to a total amount of the oxidation resistant absorbent. In an exemplary embodiment, the alkanolamine may include MEA with a weight percent of 30 wt. % to a total amount of the oxidation resistant absorbent.

In an exemplary embodiment, the base may include at least one of a salt of an alkali metal, a salt of an alkaline earth metal, and combinations thereof. In an exemplary embodiment, the base may include at least one of Potassium hydroxide (KOH), Potassium carbonate ($K_2CO_3$), Sodium hydroxide (NaOH), Sodium carbonate ($Na_2CO_3$), and combinations thereof. In an exemplary embodiment, the base may include KOH with a weight percent of 5 wt. % to a total amount of the oxidation resistant absorbent. In an exemplary embodiment, the base may be present in the formed oxidation resistant absorbent with a weight percent in a range of 1 wt. % to 15 wt. % to a total amount of the oxidation resistant absorbent.

In an exemplary embodiment, the plurality of nanoparticles may include a plurality of alumina-coated silica nanoparticles. In an exemplary embodiment, each alumina-coated silica nanoparticle of the plurality of alumina-coated silica nanoparticles may include a silica nanoparticle coated with a layer of alumina. In an exemplary embodiment, the plurality of nanoparticles may be present in the formed oxidation resistant absorbent with a weight percent in a range of 0.1 wt. % to 3 wt. % to a total amount of the oxidation resistant absorbent.

BRIEF DESCRIPTION OF THE DRAWINGS

The drawing figures depict one or more embodiments in accord with the present teachings, by way of example only, not by way of limitation. In the figures, like reference numerals refer to the same or similar elements.

DETAILED DESCRIPTION

Figure 1:
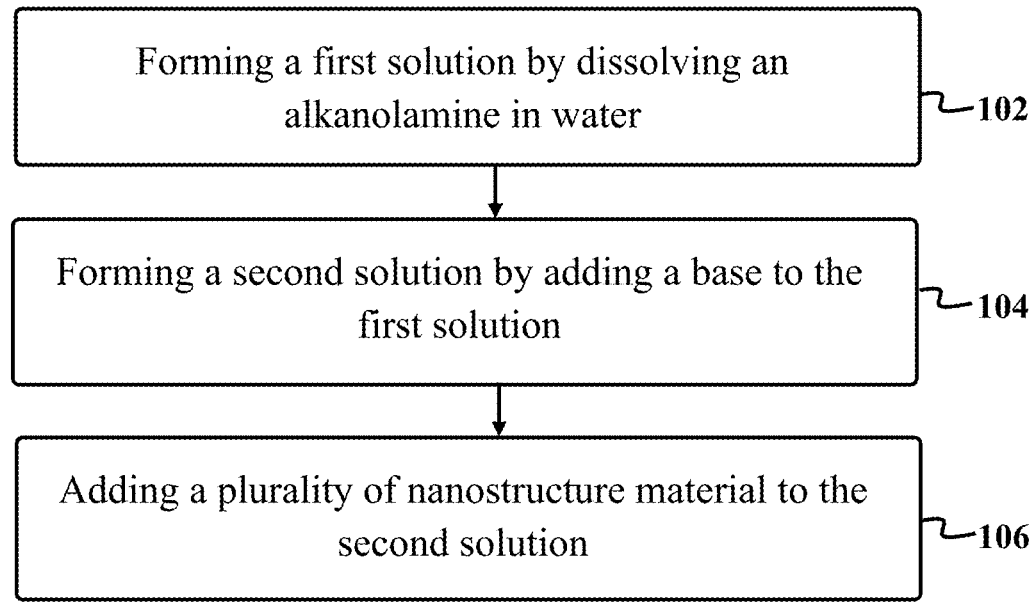
FIG. 1 shows a flowchart of an exemplary method for fabricating an exemplary absorbent, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary embodiments will be readily apparent to one skilled in the art, and the general principles defined herein may be applied to other embodiments and applications without departing from the scope of the present disclosure. The present disclosure is not intended to be limited to the embodiments shown, but is to be accorded the widest possible scope consistent with the principles and features disclosed herein.

Recovery of acid gases, and particularly, carbon dioxide ($CO_2$) from a mixture of gases is very important from an industrial and commercial point of view. Carbon dioxide is an unavoidable byproduct of combustion of hydrocarbons. $CO_2$ gas has a high potential for negative climate change in the world. Generally, an amount of $CO_2$ resulting from combustion of fossil fuels may vary between about 7% to about 15% by volume depending on type of fuel. Considering environmental effects of $CO_2$, a need to absorb and recycle $CO_2$ from combustion products becomes more important. Generally, the most common way to recover carbon dioxide is to use amine solvents. Amine traps carbon dioxide by forming ammonium salts (carbamate, bicarbonate and carbonate) in an absorption facility and the resulting material is unstable in terms of temperature. As the temperature increases in a stripping facility, a chemical bond between $CO_2$ and amine solvent is broken. Exemplary amines that are generally used for this purpose are alkanolamines, and particularly, at least one of Monoethanolamine (MEA), Diethanolamine (DEA), Triethanolamine (TEA), and a mixture thereof. Alkanolamines are generally used for refining sour gas and petroleum liquids. However, often an absorbed carbon dioxide stream contains significant levels of oxygen which can cause oxidative degradation of alkanolamines, leading to reducing their utility in amine recovery facility and also causing corrosion problems in an exemplary facility.

Herein, an absorbent for capturing undesirable compounds from a gas stream is disclosed. In an exemplary embodiment, an exemplary absorbent may be utilized for purification of an exemplary gas stream. In an exemplary embodiment, an exemplary absorbent may be utilized for capturing acid gases form an exemplary gas stream. In an exemplary embodiment, an exemplary absorbent may be particularly utilized for capturing carbon dioxide ($CO_2$) form an exemplary gas stream, such as a sour gas, a flue gas, etc. In an exemplary embodiment, an exemplary gas stream may include flue gas streams released from cement production units and/or steel production units. In an exemplary embodiment, an exemplary absorbent may include an oxidation resistant absorbent with high absorption capacity for impurities, sour gases, and particularly, $CO_2$ gas.

In an exemplary embodiment, an exemplary oxidation resistant absorbent may include an alkanolamine, a base, and a nanostructured material. In an exemplary embodiment, an exemplary oxidation resistant absorbent may further include water. In an exemplary embodiment, an exemplary oxidation resistant absorbent may include a mixture of an exemplary alkanolamine, an exemplary base, an exemplary nanostructured material, and water. In an exemplary embodiment, an exemplary oxidation resistant absorbent may include an aqueous solution of an exemplary alkanolamine, an exemplary base, and an exemplary nanostructured material.

In an exemplary embodiment, an exemplary oxidation resistant absorbent may include an exemplary alkanolamine with a weight percent in a range of 10 wt. % to 35 wt. % to a total amount of an exemplary oxidation resistant absorbent, an exemplary base with a weight percent in a range of 1 wt. % to 15 wt. % to a total amount of an exemplary oxidation resistant absorbent, and an exemplary nanostructured material with a weight percent in a range of 0.1 wt. % to 3 wt. % to a total amount of an exemplary oxidation resistant absorbent. In an exemplary embodiment, a remaining weight percent of an exemplary oxidation resistant absorbent may include water. In an exemplary embodiment, an exemplary oxidation resistant absorbent may include a suspension including particles of an exemplary nanostructured material dispersed in an exemplary suspension. In an exemplary embodiment, an exemplary oxidation resistant absorbent may include a suspension being stable for at least 72 hours without any phase changes or particles agglomeration/precipitation.

In an exemplary embodiment, an exemplary alkanolamine may include at least one of a primary alkanolamine, a secondary alkanolamine, a tertiary alkanolamine, and combinations thereof. In an exemplary embodiment, an exemplary alkanolamine may include at least one of Monoethanolamine (MEA), Diethanolamine (DEA), Triethanolamine (TEA), Methyldiethanolamine (MDEA), Diisopropanolamine (DIPA), Diglycolamine (DGA), and combinations thereof. In an exemplary embodiment, an exemplary alkanolamine may include one or more derivatives of at least one of a primary alkanolamine, a secondary alkanolamine, a tertiary alkanolamine, and combinations thereof. In an exemplary embodiment, an exemplary alkanolamine may include MEA with a weight percent of 30 wt. % to a total amount of an exemplary oxidation resistant absorbent.

In an exemplary embodiment, an exemplary base may include a base. In an exemplary embodiment, an exemplary base may include an alkali. As used herein, an "alkali" may refer to a base that dissolves in water. In an exemplary embodiment, an "alkali" may refer to a basic or ionic salt of an alkali metal or an alkaline earth metal. In an exemplary embodiment, an exemplary base may include at least one of a salt of an alkali metal, a salt of an alkaline earth metal, and combinations thereof. In an exemplary embodiment, an exemplary base may include at least one of Potassium hydroxide (KOH), Potassium carbonate ($K_2CO_3$), Sodium hydroxide (NaOH), Sodium carbonate ($Na_2CO_3$), and combinations thereof. In an exemplary embodiment, an exemplary base may include a strong base. In an exemplary embodiment, an exemplary strong base may refer to a base which dissolves in water completely and dissociates into its ions in water. In an exemplary embodiment, an exemplary strong base may have a pH value in a range of about 12 to about 14. In an exemplary embodiment, an exemplary base may include KOH with a weight percent of 5 wt. % to a total amount of the oxidation resistant absorbent.

In an exemplary embodiment, an exemplary nanostructured material may include a donor-acceptor nanostructured material. In an exemplary embodiment, an exemplary nanostructured material may be capable of absorbing/adsorbing $CO_2$ from an exemplary gas stream while contacting with an exemplary gas stream. Furthermore, an exemplary nanostructured material may be capable of donating $CO_2$ to an exemplary alkanolamine. In an exemplary embodiment, an exemplary nanostructured material may provide a high contact area for absorption of $CO_2$ by an exemplary alkanolamine. In an exemplary embodiment, an exemplary nanostructured material may include a plurality of nanoparticles. In an exemplary embodiment, an exemplary nanostructured material may include a plurality of alumina-coated silica nanoparticles. In an exemplary embodiment, each alumina-coated silica nanoparticle may include a silica nanoparticle coated with a layer of alumina.

In an exemplary embodiment, an exemplary oxidation resistant absorbent may include MEA with a weight percent of about 30 wt. % to a total amount of an exemplary oxidation resistant absorbent, KOH with a weight percent of about 5 wt. % to a total amount of an exemplary oxidation resistant absorbent, silica nanoparticles coated with alumina with a weight percent of about 1.2 wt. % to a total amount of an exemplary oxidation resistant absorbent, and water with a weight percent of about 64.8% to a total amount of an exemplary oxidation resistant absorbent.

In an exemplary embodiment, a presence of an exemplary base in an exemplary oxidation resistant absorbent may lead to increasing resistance of an exemplary oxidation resistant absorbent against oxidative degradation as well as increasing $CO_2$ absorption capacity of an exemplary oxidation resistant absorbent. In an exemplary embodiment, an exemplary strong base may increase stability of an exemplary alkanolamine against oxygen radicals attack and $CO_2$ absorption capacity of an exemplary alkanolamine. Furthermore, an exemplary strong base may reduce solubility of oxygen in an exemplary alkanolamine; thereby, resulting in reducing oxidative degradation of an exemplary alkanolamine. In an exemplary embodiment, in the presence of an exemplary strong base, both OH and NH parts of an exemplary alkanolamine may be activated to absorb $CO_2$, and hydroxyl group, which is prone to oxidation and formation of aldehyde and carboxylic acids, may be protected from oxygen attack by absorbing $CO_2$. It should be noted that a reaction of an exemplary alkanolamine with $CO_2$ is a two-step reaction. In a first step, an exemplary alkanolamine is protonated and then in a second step, an exemplary protonated alkanolamine reacts with carbon dioxide. An exemplary protonated amine has a high potential to react with oxygen. In an exemplary embodiment of the present disclosure, a presence of an exemplary base in composition of an exemplary oxidation resistant absorbent may prevent oxygen from attacking an exemplary alkanolamine since an exemplary base may act as a sacrificial agent reacting with oxygen. In an exemplary embodiment, using an exemplary strong base and an exemplary nanostructured material in composition of an exemplary oxidation resistant absorbent may lead to achieve a high $CO_2$ absorption rate. For example, $CO_2$ absorption rate of MEA is about 0.5 mole of $CO_2$ per one mole of MEA while a $CO_2$ absorption rate of 3 moles of $CO_2$ per one mole of MEA may be reached for an exemplary oxidation resistant absorbent. In an exemplary embodiment, an increase in $CO_2$ absorption of an exemplary oxidation resistant absorbent may be due to increasing polarity of an exemplary alkanolamine by an exemplary strong base and increasing contact area between $CO_2$ and an exemplary alkanolamine due to capturing $CO_2$ in an exemplary nanostructured material (e.g., nanopores of an exemplary nanostructured material); thereby, resulting in dissolving a high extent of $CO_2$ in an exemplary alkanolamine. Moreover, because a carbon-oxygen bond is weaker than a carbon-nitrogen bond; breaking a formed bond in an exemplary $CO_2$ capturing process and releasing $CO_2$ from an exemplary oxidation resistant absorbent may occur at a lower temperature with less energy consumption in comparison with a common $CO_2$ capturing process using an exemplary alkanolamine as $CO_2$ absorbent.

In an exemplary embodiment, an amount (or concentration) of an exemplary alkanolamine and/or an amount (or concentration) of an exemplary strong base in an exemplary oxidation resistant absorbent may be adjusted based on one or more parameter of a set of parameters, including oxygen concentration in an exemplary gas stream (e.g., a flue gas), $CO_2$ concentration in an exemplary gas stream (e.g., a flue gas), loading rate (amount of moles of $CO_2$ absorbed per mole of an exemplary alkanolamine), minimum working temperature of an exemplary absorption process using an exemplary oxidation resistant absorbent, and absorption efficiency as a function of amount of $CO_2$ to be absorbed by an exemplary oxidation resistant absorbent in an exemplary gas stream (e.g., a flue gas). For example, a weight percent of an exemplary strong base may be adjusted in a range of 1 wt. % to 5 wt. % to a total amount of an exemplary oxidation resistant absorbent when oxygen concentration in an exemplary gas stream (e.g., a flue gas) is less than about 2 wt. % in an exemplary gas stream. Furthermore, an exemplary weight percent of an exemplary strong base may be adjusted in a range of 10 wt. % to 15 wt. % to a total amount of an exemplary oxidation resistant absorbent when oxygen concentration in an exemplary gas stream (e.g., a flue gas) is about 5 wt. % or more in an exemplary gas stream.

In an exemplary embodiment, an exemplary oxidation resistant absorbent may be adaptable for use in different conditions of a target carbon capturing site by adjusting a concentration of each of an exemplary alkanolamine, an exemplary base, and an exemplary nanostructured material in composition of an exemplary oxidation resistant absorbent. In an exemplary embodiment, concentrations and ratios of an exemplary alkanolamine, an exemplary base, and an exemplary nanostructured material in composition of an exemplary oxidation resistant absorbent may be adjusted according to a $CO_2$ concentration of an exemplary gas stream; leading to achieve the highest absorption amount of $CO_2$ into an exemplary oxidation resistant absorbent.

In an exemplary embodiment of the present disclosure, a method for fabricating an exemplary absorbent is disclosed. In an exemplary embodiment, an exemplary absorbent may include an exemplary oxidation resistant absorbent described hereinabove. In an exemplary embodiment, an exemplary absorbent may include an exemplary oxidation resistant absorbent for capturing $CO_2$ as described hereinabove. FIG. 1 shows a flowchart of an exemplary method 100 for fabricating an exemplary absorbent, consistent with one or more exemplary embodiments of the present disclosure. Exemplary method 100 may include forming a first solution by dissolving an alkanolamine in water (step 102), forming a second solution by adding a base to the first solution (step 104), and adding a plurality of nanostructured material to the second solution (step 106).

In further detail with respect to step 102, an exemplary alkanolamine may be dissolved in water; thereby, forming an exemplary first solution. In an exemplary embodiment, step 102 may include mixing an exemplary alkanolamine with water. In an exemplary embodiment, step 102 may include mixing an aqueous solution of an exemplary alkanolamine and water. In an exemplary embodiment, mixing an exemplary alkanolamine with water may be carried out at ambient conditions. In an exemplary embodiment, mixing an exemplary alkanolamine with water may be carried out at a temperature in a range of about 20° C. to about 30° C. In an exemplary embodiment, mixing an exemplary alkanolamine with water may be carried out at a pressure of about 1 bar. In an exemplary embodiment, mixing an exemplary alkanolamine with water may be carried out using a mixer with a mixing speed in a range of 400 rpm to 600 rpm. In an exemplary embodiment, mixing an exemplary alkanolamine with water may be carried out for a time period in a range of about 15 minutes to about 2 hours. In an exemplary embodiment, mixing an exemplary alkanolamine with water may be carried out for a time period of about 1 hour. In an exemplary embodiment, an exemplary alkanolamine may include at least one of a primary alkanolamine, a secondary alkanolamine, a tertiary alkanolamine, and combinations thereof. In an exemplary embodiment, an exemplary alkanolamine may include at least one of Monoethanolamine (MEA), Diethanolamine (DEA), Triethanolamine (TEA), Methyldiethanolamine (MDEA), Diisopropanolamine (DIPA), Diglycolamine (DGA), and combinations thereof. In an exemplary embodiment, an exemplary alkanolamine may include one or more derivatives of at least one of a primary alkanolamine, a secondary alkanolamine, a tertiary alkanolamine, and combinations thereof.

In further detail with respect to step 104, a second solution may be formed by adding a base to the first solution. In an exemplary embodiment, step 104 may include forming an exemplary second solution by dissolving an exemplary base in an exemplary first solution. In an exemplary embodiment, step 104 may include one of pouring an exemplary base into an exemplary first solution or dropwise adding an exemplary base into an exemplary first solution. In an exemplary embodiment, step 104 may further include mixing an exemplary base with an exemplary first solution. In an exemplary embodiment, step 104 may be carried out at ambient conditions at a temperature in a range of about 20° C. to about 30° C. and a pressure of about 1 bar. In an exemplary embodiment, step 104 may include adding an alkali to the first solution. In an exemplary embodiment, step 104 may include adding at least one of a salt of an alkali metal, a salt of an alkaline earth metal, and combinations thereof to the first solution. In an exemplary embodiment, step 104 may include adding at least one of Potassium hydroxide (KOH), Potassium carbonate ($K_2CO_3$), Sodium hydroxide (NaOH), Sodium carbonate ($Na_2CO_3$), and combinations thereof to the first solution.

In further detail with respect to step 106, a plurality of nanostructured material may be added to an exemplary second solution. In an exemplary embodiment, adding an exemplary plurality of nanostructured material (step 106) may include adding an exemplary plurality of nanoparticles to an exemplary second solution. In an exemplary embodiment, an exemplary nanostructured material may be added to an exemplary second solution continuously with a rate of about 1 Kg/h. In an exemplary embodiment, a powder of an exemplary nanostructured material may be added to an exemplary second solution. In an exemplary embodiment, adding an exemplary nanostructured material to an exemplary second solution may include adding a plurality of alumina-coated silica nanoparticles to an exemplary second solution. In an exemplary embodiment, each alumina-coated silica nanoparticle may include a silica nanoparticle coated with a layer of alumina. In an exemplary embodiment, adding an exemplary plurality of nanostructured material to an exemplary second solution (step 106) may include forming a mixture of an exemplary plurality of nanostructured material and an exemplary second solution by mixing an exemplary plurality of nanostructured material with an exemplary second solution in a vessel. In an exemplary embodiment, mixing an exemplary plurality of nanostructured material with an exemplary second solution in an exemplary vessel may be done using a mixer with a mixing speed in a range of 400 rpm to 600 rpm for a time period in a range of about 15 minutes to about 2 hours. In an exemplary embodiment, adding an exemplary plurality of nanostructured material to an exemplary second solution (step 106) may further include dispersing an exemplary plurality of nanostructured material in an exemplary second solution. In an exemplary embodiment, dispersing an exemplary plurality of nanostructured material in an exemplary second solution may include increasing a pressure of an exemplary mixture of an exemplary plurality of nanostructured material and an exemplary second solution and recycling an exemplary pressurized mixture of an exemplary plurality of nanostructured material and an exemplary second solution into an exemplary vessel. In an exemplary embodiment, recycling an exemplary pressurized mixture of an exemplary plurality of nanostructured material and an exemplary second solution into an exemplary vessel may include returning back an exemplary pressurized mixture of an exemplary plurality of nanostructured material and an exemplary second solution into an exemplary vessel. In an exemplary embodiment, increasing an exemplary pressure of an exemplary mixture of an exemplary plurality of nanostructured material and an exemplary second solution may include increasing an exemplary pressure of an exemplary mixture of an exemplary plurality of nanostructured material and an exemplary second solution up to about 200 bar. In an exemplary embodiment, increasing an exemplary pressure of an exemplary mixture of an exemplary plurality of nanostructured material and an exemplary second solution may be carried out utilizing a high-pressure pump. In an exemplary embodiment, increasing an exemplary pressure of an exemplary mixture of an exemplary plurality of nanostructured material and an exemplary second solution may be carried out utilizing a supersonic pump or a supersonic jet pump.

Figure 2:
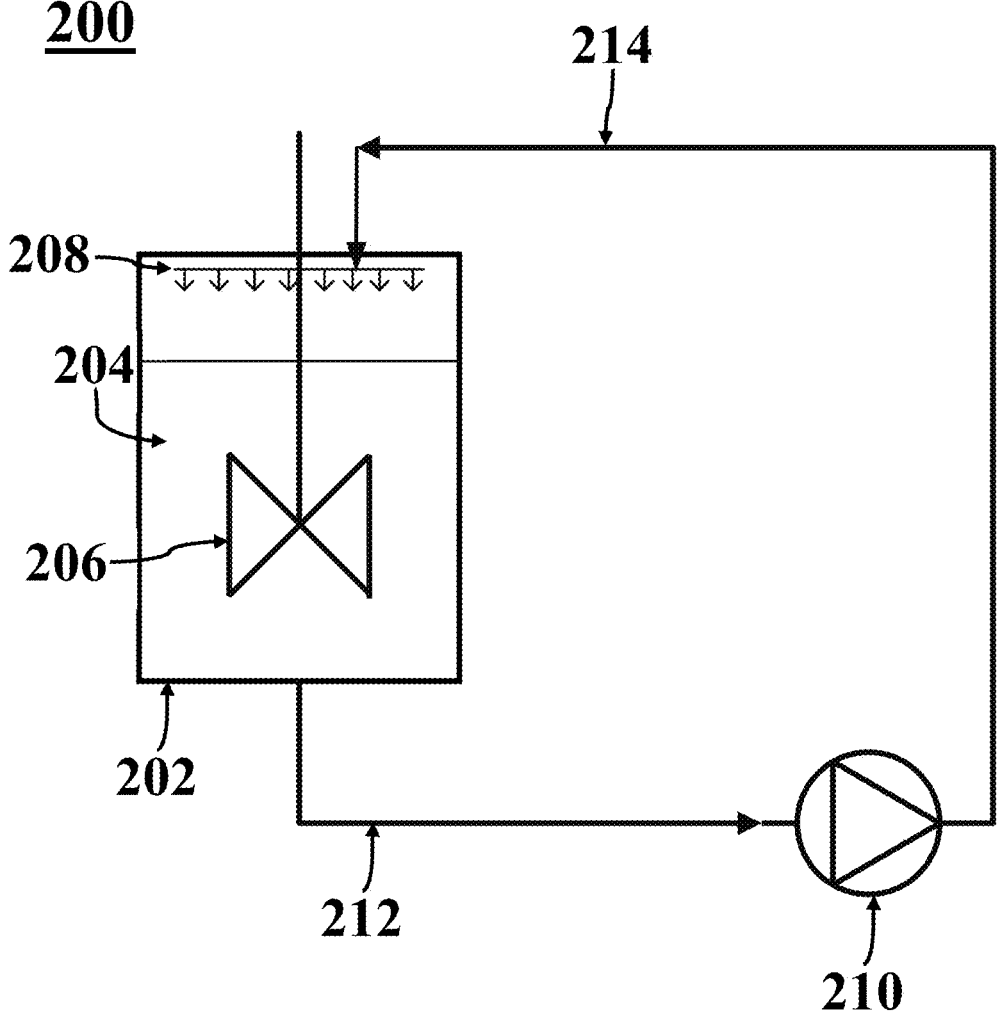
FIG. 2 shows a schematic view of an exemplary process for adding an exemplary plurality of nanostructured material to an exemplary second solution, consistent with one or more exemplary embodiments of the present disclosure.

FIG. 2 shows a schematic view 200 of an exemplary process for adding an exemplary plurality of nanostructured material to an exemplary second solution (step 106), consistent with one or more exemplary embodiments of the present disclosure. In an exemplary embodiment, a mixture 204 of an exemplary plurality of nanostructured material and an exemplary second solution may be formed by mixing an exemplary plurality of nanostructured material and an exemplary second solution in a vessel 202 using a mixer 206. In an exemplary embodiment, an exemplary plurality of nanostructured material (not illustrated) may be homogenously dispersed in mixture 204 by increasing a pressure of mixture 204 using a pump 210 and recycling an exemplary pressurized mixture 204 via line 214 to vessel 202. In an exemplary embodiment, mixture 204 may be transferred to pump 210 via line 212 and a pressure of mixture 204 may be increased up to about 200 bar utilizing pump 210. In an exemplary embodiment, pump 210 may include a high-pressure pump. In an exemplary embodiment, pump 210 may include a supersonic jet pump. In an exemplary embodiment, an exemplary pressurized mixture 204 transferred to vessel 202 may be sprayed into vessel 202 using a liquid sprayer instrument 208. In an exemplary embodiment, liquid sprayer instrument 208 may include a water jet. In an exemplary embodiment, a lid of vessel 202 may be closed after initially adding an exemplary plurality of nanostructured material to an exemplary second solution.

In an exemplary embodiment, steps 102, 104, and 106 may include adjusting a level of an amount of each of an exemplary alkanolamine, an exemplary base, and an exemplary nanostructured material, and water at a predetermined set of concentrations. In an exemplary embodiment, an exemplary predetermined set of concentrations may include an exemplary alkanolamine with a weight percent in a range of 10 wt. % to 35 wt. % to a total amount of an exemplary oxidation resistant absorbent, an exemplary base with a weight percent in a range of 1 wt. % to 15 wt. % to a total amount of an exemplary oxidation resistant absorbent, and an exemplary nanostructured material with a weight percent in a range of 0.1 wt. % to 3 wt. % to a total amount of an exemplary oxidation resistant absorbent. In an exemplary embodiment, an exemplary predetermined set of concentrations may include MEA with a weight percent of about 30 wt. % to a total amount of an exemplary oxidation resistant absorbent, KOH with a weight percent of about 5 wt. % to a total amount of an exemplary oxidation resistant absorbent, silica nanoparticles coated with alumina with a weight percent of about 1.2 wt. % to a total amount of an exemplary oxidation resistant absorbent, and water with a weight percent of about 64.8% to a total amount of an exemplary oxidation resistant absorbent.

Example 1: Oxidation Resistant Absorbents with High $CO_2$ Absorption Capacity In this example, exemplary absorbents similar to an exemplary oxidation resistant absorbent described herein above were fabricated with different compositions utilizing a method similar to exemplary method 100 described above. $O_2$ and $CO_2$ absorption rate of the fabricated absorbents and their chemical stability were tested in comparison with each other and with an alkanolamine absorbent. Suspension stability of exemplary oxidation resistant absorbents fabricated according to an exemplary method similar to exemplary method 100 containing MEA as an exemplary alkanolamine, KOH as an exemplary base, and silica nanoparticles coated with alumina as an exemplary nanostructured material were tested and a stability of at least about 72 hours without any phase changes or particles agglomeration/precipitation was detected.

For measuring an absorption rate of $O_2$, the fabricated absorbents were contacted with gas streams containing $O_2$ and $N_2$ with different volume concentrations of $O_2$ for about 20 minutes in an absorption column at ambient conditions (a temperature between about 20° C. and 30° C. and a pressure of about 1 bar). An amount of absorbed $O_2$ to the fabricated absorbents was measured using a dissolved oxygen meter device. The composition of each absorbent and $O_2$ absorption amount are presented in Table 1. As may be seen from Table 1, the presence of a strong base (i.e., KOH) in composition of an exemplary fabricated absorbent reduces $O_2$ solubility in the fabricated absorbents and increasing an amount of KOH leads to more reduction of $O_2$ solubility in the fabricated absorbents; thereby, resulting in more resistance against oxidative degradation of an exemplary absorbent.

TABLE 1

| $O_2$ solubility in the fabricated absorbents for various compositions of absorbents | | | | | | | | |
|---|---|---|---|---|---|---|---|---|
| | $O_2$ concentration in input gas stream (% V/V) | | | | | | | |
| | 1.6 | 2.7 | 4.4 | 7 | 10.2 | 14.4 | 18 | 20.2 |
| Absorbent composition | $O_2$ solubility in the absorbent (ppm) | | | | | | | |
| 30 wt. % MEA, 0 wt. % KOH | 2.5 | 3 | 3.2 | 3.4 | 3.7 | 4.1 | 4.4 | 4.4 |
| 30 wt. % MEA, 1 wt. % KOH | 2.3 | 2.8 | 3 | 3.1 | 3.4 | 3.7 | 3.8 | 3.8 |

TABLE 1-continued

O₂ solubility in the fabricated absorbents for various compositions of absorbents

| | O₂ concentration in input gas stream (% V/V) | | | | | | | |
|---|---|---|---|---|---|---|---|---|
| | 1.6 | 2.7 | 4.4 | 7 | 10.2 | 14.4 | 18 | 20.2 |
| Absorbent composition | O₂ solubility in the absorbent (ppm) | | | | | | | |
| 30 wt. % MEA, 2 wt. % KOH | 2.1 | 2.6 | 2.9 | 3.1 | 3.3 | 3.6 | 3.7 | 3.7 |
| 30 wt. % MEA, 3 wt. % KOH | 2.1 | 2.6 | 2.8 | 2.9 | 3.3 | 3.6 | 3.6 | 3.6 |
| 30 wt. % MEA, 4 wt. % KOH | 2.1 | 2.5 | 2.8 | 2.9 | 3.2 | 3.5 | 3.5 | 3.5 |

Furthermore, $CO_2$ absorption loading by the fabricated absorbents was tested using a Chittick apparatus. In an exemplary test, a known volume of a liquid sample including an exemplary fabricated absorbent solvent (10-15 mL depending on a $CO_2$ content) is added to an Erlenmeyer flask, which is placed on a magnetic stirrer with methyl orange as an indicator. The flask contains a magnet and stirring helps releasing $CO_2$ gas from the solution. HCl solution with concentration of 1 (mol L⁻¹) is added to the liquid sample from a burette. Upon addition of HCl, $CO_2$ is released as a gas and flows upward and exits the flask through a tube fitted in a rubber stopper and displaces a colored non-reactive liquid level in a graduated gas measuring glass tube with ±2 mL accuracy. $CO_2$ loading of the liquid sample ($\alpha_{CO2}$) is then obtained using ideal gas law as follows in Equation 1:

$$\alpha_{CO_2} = \frac{mol_{CO_2}}{mol_{pz}} = \frac{\left[\frac{(V_{gas} - V_{HCl})(P)}{RT}\right]}{C_1 V_1} \qquad \text{(Equation 1)}$$

Where $V_{gas}$ (mL) denotes a volume of the displaced liquid in the graduated gas measuring tube. Volume of the released $CO_2$ gas is obtained after subtracting the HCl solution volume added to the Erlenmeyer flask, $V_{HCl}$ (mL) from $V_{gas}$, as follows in Equation 2:

$$V_{CO2} = V_{gas} - V_{HCl} \qquad \text{(Equation 2)}$$

R designates the universal gas constant equal to 8.314 (L kPa) (mol K)⁻¹, and P (kPa) and T (K) represent the atmospheric pressure (101.3 kPa) and the room temperature, respectively.

Composition of four exemplary fabricated absorbent solvents and their respective $CO_2$ absorption amount are presented in Table 2. As may be seen, absorbent solvent 4 having higher percent of KOH and alumina-coated silica NPs has the highest $CO_2$ absorption ability in the same conditions of tests. A total amount of 0.5 gr of MEA, KOH, and NPs were added in both absorbent solvents 2 and 4; however, it may be seen that a solubility of KOH was increased by adding NPs.

TABLE 2

CO₂ absorption capacity of the fabricated absorbents
for various compositions of absorbents

| Absorbent ID | MEA | KOH | Alumina-coated Silica NPs | ΔT (° C.) | (mol CO₂/mol MEA) LOADING |
|---|---|---|---|---|---|
| 1 | 30 | 0 | 0 | 35 | 0.483 |
| 2 | 30 | 0.38% | 0 | 25.2 | 0.612 |
| 3 | 30 | 0 | 2 | 30 | 0.591 |
| 4 | 30 | 0.45% | 2 | 27.6 | 0.730 |

Moreover, for analyzing the degradation of the fabricated absorbent solvents, concentration of thermally stable salts due to amine degradation was measured. A permissible concentration of thermally stable salts in amine should be less than about 2.5% to 3% for having a chemically stable absorbent solvent. This measurement was carried out for an exemplary fabricated absorbent solvent having a composition of 30% MEA, 3% KOH, and 0.3% Alumina-coated Silica NPs using an ion chromatography device by measuring anions produced due to amine degradation. An obtained concentration of thermally stable salts anions was less than about 2% as may be seen in Table 3. The sample report of amine analysis and the amount of thermally stable salts by adding alkali and nano materials and exposure to a flue gas is presented in Table 3.

TABLE 3

Anions concentration of thermally stable salts produced by degradation
of the fabricated absorbents measured by ion chromatofraphy

| Anions | Amount |
|---|---|
| Acetate | 0.67% |
| Formate | 0.23% |
| Chloride | 10% |
| Sulfate | 15% |
| Oxalate | 110 ppm |
| Thiosulfate | <1 ppm |
| Thiocyanate | <1 ppm |
| Nitrate | 0.017% |
| Phosphate | 11 ppm |

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments. This is for purposes of streamlining the disclosure, and is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments have been described, the description is intended to be exemplary, rather than limiting and it will be apparent to those of ordinary skill in the art that many more embodiments and embodiments are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. An oxidation resistant absorbent for capturing carbon dioxide from a gas stream, the oxidation resistant absorbent comprising:
   an alkanolamine comprising Monoethanolamine (MEA) with a weight percent of 30 wt. % to a total amount of the oxidation resistant absorbent;
   an alkali comprising Potassium hydroxide (KOH) with a weight percent of 5 wt. % to a total amount of the oxidation resistant absorbent;
   a plurality of nanoparticles, each respective nanoparticle comprising a silica nanoparticle coated with a layer of alumina, the plurality of nanoparticles being present in the oxidation resistant absorbent with a weight percent of 1.2 wt. % to a total amount of the oxidation resistant absorbent,
   wherein a remaining weight percent of the oxidation resistant absorbent consists of water.

2. An oxidation resistant absorbent for capturing carbon dioxide from a gas stream, the oxidation resistant absorbent comprising:
   an alkanolamine with a weight percent in a range of 10 wt. % to 35 wt. % to a total amount of the oxidation resistant absorbent;
   a base with a weight percent in a range of 1 wt. % to 15 wt. % to a total amount of the oxidation resistant absorbent; and
   a plurality of nanoparticles with a weight percent in a range of 0.1 wt. % to 3 wt. % to a total amount of the oxidation resistant absorbent.

3. The oxidation resistant absorbent of claim 2, wherein the alkanolamine comprises at least one of Monoethanolamine (MEA), Diethanolamine (DEA), Triethanolamine (TEA), Methyldiethanolamine (MDEA), Diisopropanolamine (DIPA), Diglycolamine (DGA), and combinations thereof.

4. The oxidation resistant absorbent of claim 3, wherein the alkanolamine comprises MEA with a weight percent of 30 wt. % to a total amount of the oxidation resistant absorbent.

5. The oxidation resistant absorbent of claim 2, wherein the base comprises at least one of a salt of an alkali metal, a salt of an alkaline earth metal, and combinations thereof.

6. The oxidation resistant absorbent of claim 5, wherein the base comprises at least one of Potassium hydroxide (KOH), Potassium carbonate ($K_2CO_3$), Sodium hydroxide (NaOH), Sodium carbonate ($Na_2CO_3$), and combinations thereof.

7. The oxidation resistant absorbent of claim 6, wherein the base comprises KOH with a weight percent of 5 wt. % to a total amount of the oxidation resistant absorbent.

8. The oxidation resistant absorbent of claim 2, wherein the plurality of nanoparticles comprises a plurality of alumina-coated silica nanoparticles, each respective alumina coated silica nanoparticle comprising a silica nanoparticle coated with a layer of alumina.

9. The oxidation resistant absorbent of claim 2, further comprising water,
   wherein a remaining weight percent of the oxidation resistant absorbent comprises water.

* * * * *